Jan. 15, 1935. M. S. UNGER ET AL 1,988,026
SNAP ACTING VALVE
Filed May 31, 1932 2 Sheets-Sheet 1
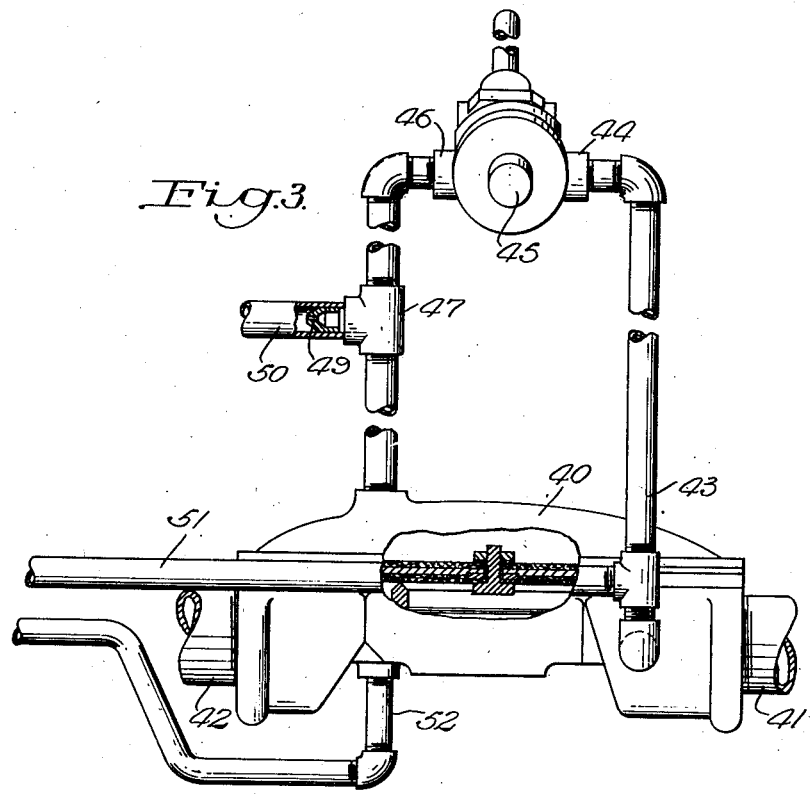
INVENTORS
Max S. Unger
Clarence W. Robertson

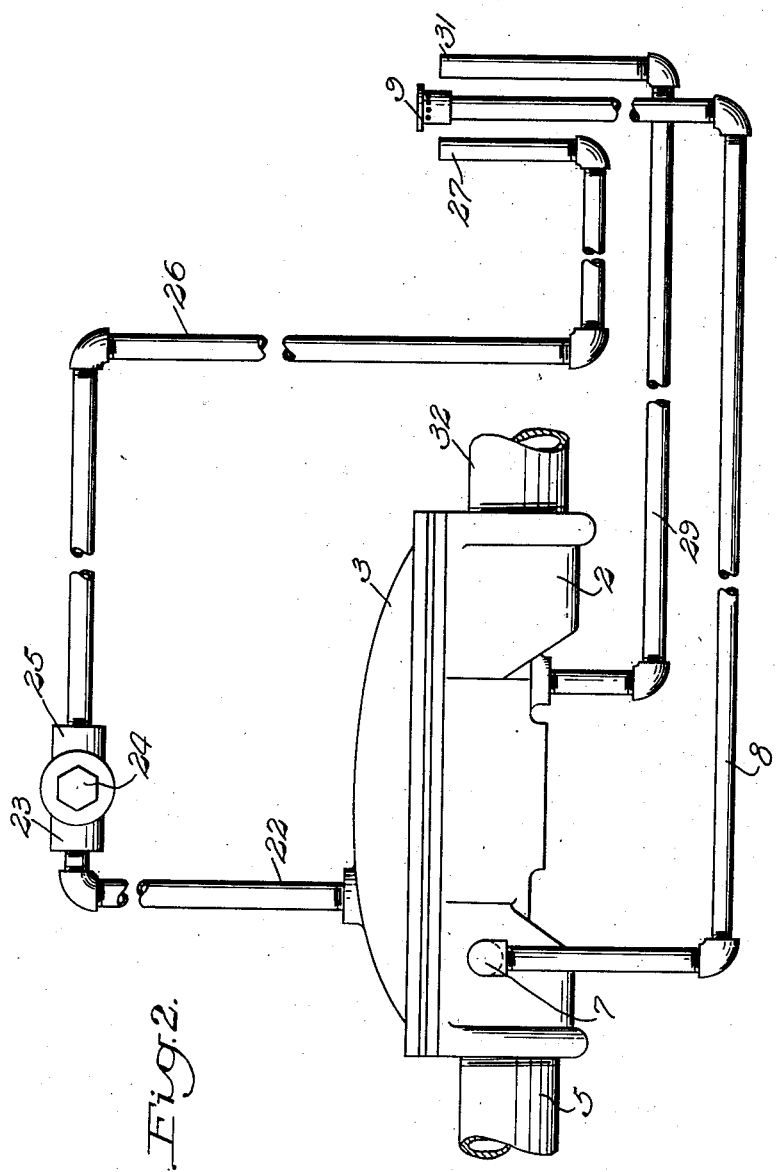

Patented Jan. 15, 1935

1,988,026

UNITED STATES PATENT OFFICE 1,988,026

SNAP ACTING VALVE

Max S. Unger and Clarence W. Robertshaw, Youngwood, Pa., assignors to Robertshaw Thermostat Company, Youngwood, Pa., a corporation of Pennsylvania Application May 31, 1932, Serial No. 614,372

9 Claims. (Cl. 236—81)

The present invention relates broadly to control mechanisms for fluid distributing systems, such as systems provided for the flow of fuel to a burner or burners, and more particularly to a control mechanism embodying an improved form of diaphragm valve of such construction as to insure a snap action thereof.

It is customary at the present time to utilize diaphragm valves to a very considerable extent for the controlling of the gas flow to a burner. In spite, however, of the rapidity with which it has heretofore been possible to operate such valves whereby a partial so-called snap action was obtained, the valves have met with the objection that they do not constitute true snap action devices. In a true snap action device, there is either a full flow of fluid sufficient to sustain the desired combustion, or the flow is cut off completely. In other words, there is no period of transition such as represented by a gradual diminishing of gas flow from the desired maximum to zero.

The objection to diaphragm valves as heretofore provided has become more and more serious as the burner art has developed, due to the tendency of manufacturers to increase the heating capacity of burners without increasing their size, this usually being done by increasing the size of the burner openings. This increases the likelihood of flashing back in the burners, thereby making it extremely important to so control the supply of fuel that when the burner is operative it will burn only at its greatest consuming point, and when the desired heating has been accomplished, the supply of gas will be completely and instantaneously shut off.

With the usual diaphragm type valve, when the diaphragm becomes almost balanced, i. e., when the pressure on the bottom and top of the diaphragm becomes nearly equal, there is not infrequently a slight leakage of gas past the seat. This has limited the use of diaphragm valves, since it has been necessary to select burners for use therewith which will not readily flash back.

In accordance with the present invention there is provided a diaphragm valve structure of such improved characteristics that it is possible to utilize a thermostatically or otherwise controlled diaphragm valve as a true snap action valve, by delaying the unrestricted passage of gas or other fluid from such valve to the burner, and then automatically increasing the effective pressure area on one side of the diaphragm in such manner that the increased area on which the pressure is effective is sufficient to insure a quick and forcible opening movement of the valve. This constitutes one of the objects of the present invention.

In the accompanying drawings there are shown for purposes of illustration only, and more or less diagrammatically, certain preferred embodiments of the present invention. In the drawings—

Figure 1 is a transverse sectional view through one form of valve constructed in accordance with the present invention;

Figure 2 is a side elevational view, on a smaller scale, of the valve shown in Figure 1, certain of the piping connections being included; and Figure 3 is a view similar to Figure 2 illustrating a modified embodiment of the invention.

In accordance with the present invention, there may be provided a diaphragm chamber as illustrated in Figure 1, comprising a bottom casting 2 and an upper casting 3, of suitable size and contour, having peripheral portions machined to receive therebetween a flexible diaphragm 4 of leather or other suitable material.

Formed in the bottom casting 2 is an inlet 5 for the purpose of admitting to the chamber 6 below the diaphragm 4 the fluid to be controlled. Communicating with the chamber 6 at a suitable point is a pilot connection 7, as shown in Figure 2 communicating with a pilot line 8 supplying a combustible fluid to a pilot burner 9 located at any desired point.

The lower casting 2 is also shaped to provide an inner annular seat 10 and an outer annular seat 11, these seats being shown as concentrically arranged, although such a relationship is not essential. The seats 10 and 11 are illustrated in Figure 1 as terminating in different horizontal planes. This construction is shown for the reason that the outer seat 11 contacts directly with the diaphragm 4, while the inner seat 10 is adapted to have seating engagement with a resilient facing disk 12 of leather or other suitable material backed preferably by a felt layer 14 which is stiffened by a metallic disk 15 preferably of aluminum due to its light weight. Extending through the layers 12, 14, 15 and 4 is a bolt 16 formed with a longitudinally extending port 17 connecting at one end with a slot 18 communicating with the chamber 6, and at the opposite end with an orifice 19 communicating with the chamber 20 above the diaphragm 4. The slot 18 is covered by a metallic disk or shield 21, thereby tending to prevent the passage of solid particles into the interior of the bolt 16 from the chamber 6.

Leading from the chamber 20 above the diaphragm is a bleed relief line 22 leading to the inlet 23 of a thermostatically controlled valve 24 the outlet 25 of which is connected by a pressure relief line 26 with a burner 27 preferably located adjacent the pilot 9 so that any combustible escaping through the pressure relief line may be ignited by the pilot flame.

Formed in the casting 2 intermediate the seats 10 and 11 is an intermediate chamber 28 from which extends a relief line 29 in communication with the intermediate chamber through a restricted orifice 30, and leading to a suitable burner 31 also preferably adjacent the pilot 9. Leading from the casting 2 exteriorly of the seat 11 is an outlet connection 32 which leads to the burner, not shown, the supply to which is to be controlled.

With the construction described, it may be assumed that the temperature condition being controlled has fallen to such a point that the thermostatic valve 24 has established communication between the bleed relief line 22 and the pressure relief line 26, thereby permitting any accumulated pressure in the chamber 20 to be released.

At the time the thermostatic valve 24 is operated to open the line referred to, it will be apparent that by reason of the passages through the bolt 16 a fluid pressure exists in the diaphragm chambers 6 and 20, which pressures are substantially equal. The pressure in the chamber 6 is only effective over that portion of the area of the diaphragm valve which is defined by the seat 10, while the pressure above the diaphragm is effective over its entire area. This is sufficient for insuring positive seating of the diaphragm against both the inner and outer seats. Upon opening of the thermostatic valve 24, the pressure on top of the diaphragm gradually diminishes until the pressure below the diaphragm is great enough to overcome the diminished pressure on top and raise the valve off its seats, thereby establishing a free flow from the inlet 9 to the outlet 32.

The opening operation referred to is of a distinctive type. At the instant of opening the thermostatic valve, the unit pressure above and below the diaphragm being substantially equal, the diaphragm due to the pressure areas referred to cannot move upwardly. When the pressure on top of the diaphragm begins to diminish, however, pressure conditions are gradually established of such nature that the pressure against the smaller area within the seat 10 is sufficient to raise the valve from the seat 10 and permit fluid to pass from the chamber 6 into the intermediate chamber 28. This increases the area against which the inlet pressure is effective so that the valve is quickly and forcibly raised to its uppermost position, this raising or final opening movement occurring with what is known as a snap action, the secondary bleed opening 30 not being large enough to reduce the pressure in the intermediate chamber as fast as it is built up due to the flow from the inlet. During the time the valve is opened a small amount of fluid will continue to bleed through the secondary opening 30 and burn at the auxiliary burner 31.

For purposes of a better understanding of the invention, it may be assumed that the diameter of the inner seat 10 is 2 inches. In such a structure, the area of the valve disk enclosed by the inner seat would be 3.1416 square inches. If the seat 11 is spaced a distance of ½ inch from the seat 10, the area enclosed within the valve seat 11 will be 7.0686 square inches, which is more than twice the area enclosed within the seat 10. It is this sudden increasing of the pressure area which is effective for producing the snap action referred to.

When the desired temperature conditions are obtained, the thermostatic valve 24 moves in the reverse direction, cutting off communication between the bleed relief line 22 and the pressure relief line 26, thereby permitting fluid pressure to gradually build up in the chamber 20 due to the flow through the hollow bolt 16. When the pressure above the valve is substantially equal to, but slightly less than the pressure below the valve, the valve will move to its closed position since closing movement is effected not only by the pressure, but by the weight of the valve. The valve having been closed, it will remain closed until the primary bleed relief line 22 is again opened.

In Figure 3 there is illustrated a slightly modified embodiment of the invention, the interior of the valve shown in this figure being substantially the same as that before described with the exception that the bolt passing through the diaphragm is solid so that the chamber above the diaphragm is not in communication with the chamber below the diaphragm insofar as flow through the diaphragm itself is concerned. In this embodiment the diaphragm valve casing 40 has an inlet 41 and an outlet 42. The inlet communicates through a connection 43 to the inlet 44 of a reverse acting thermostatically controlled valve 45, the outlet 46 of which leads to a coupling 47. The chamber above the diaphragm is likewise connected through a pipe 48 with the coupling 47, this coupling communicating through a fixed bleed orifice 49 to a bleed line 50 which may terminate adjacent a pilot burner as before described. Such pilot may be fed from a line 51 communicating with the connection 43.

Leading from the space intermediate the concentric valve seats is a secondary bleed line 52 similar in all respects to the secondary bleed line 29 described in connection with Figures 1 and 2. With this construction, when the desired temperature has been reached, the reversely acting thermostat will open the valve 45 and establish a flow connection between the inlet 44 and the outlet 46, thus permitting fluid under pressure to flow from the inlet 41 of the diaphragm valve to the chamber above the diaphragm. This flow will be effective for building up a pressure above the diaphragm sufficient to force the diaphragm against its seats. This relationship will be maintained until such time as the temperature drops to a predetermined point at which time the reverse acting thermostat will close the valve 45 and cut off flow therethrough.

The flow having been cut off, the pressure above the diaphragm will be gradually bled away through the bleed orifice 49 until such time as the pressure below the diaphragm and within the inner seat is sufficient to slightly raise the diaphragm valve and increase the valve area subjected to pressure. At such time the valve will snap open in the manner before described.

A valve constructed in accordance with the present invention includes means for changing, under predetermined conditions, the area of the valve subjected to inlet pressure in such manner that the changed area will be effective for insuring a quick or snap opening movement of the valve. In accordance with the preferred embodiment of our invention such an area change will be obtained by the provision of spaced valve seats, preferably substantially concentric, with a secondary bleed from the intermediate chamber between the seats, but with the flow area to the secondary bleed so restricted as to make it possible when the intermediate chamber is in communication with the inlet to establish substantially inlet pressure therein.

The advantages of the present invention arise from the provision of a diaphragm valve of such construction that a snap action thereof may be obtained.

While we have herein illustrated and described a preferred embodiment of our invention, it will be understood that changes in the construction and arrangement of parts may be made without departing either from the spirit of our invention or the scope of our broader claims.

We claim:

1. As an article of manufacture, a diaphragm valve comprising a casing having a diaphragm, a plurality of seats of different diameters one outside of the other for engaging said diaphragm, and fluid pressure connections including an inlet communicating with one side of the diaphragm and means for subjecting the other side thereof to inlet pressure for first raising the diaphragm from the inner seat and then from the outer seat.

2. As an article of manufacture, a diaphragm valve comprising a casing having a diaphragm, a plurality of seats of different diameters one outside of the other for engaging said diaphragm, and fluid pressure connections including an inlet communicating with both sides of the diaphragm for first raising the diaphragm from the inner seat and then from the outer seat, said connections including a bleed opening for the space intermediate said seats.

3. In a diaphragm valve, a casing having a plurality of substantially concentric seats providing a space therebetween, a diaphragm for engagement with said seats, means for subjecting one side of the diaphragm within the smaller of said seats to inlet pressure, means for subjecting the opposite side of the diaphragm to inlet pressure, means for bleeding the pressure effective against said last mentioned side of the diaphragm, and an outlet connection from said casing.

4. In a diaphragm valve, a casing having an inlet and outlet, a diaphragm, a plurality of spaced seats of different included areas for said diaphragm with the inlet communicating with the area within the seat of smallest included area, there being a chamber intermediate said seats, a bleed connection for said chamber, and means for subjecting the side of said diaphragm remote from said seats to inlet pressure.

5. In a diaphragm valve, a casing having an inlet and outlet, a diaphragm, a plurality of spaced seats of different included areas for said diaphragm with the inlet communicating with the area within the seat of smallest included area, there being a chamber intermediate said seats, a bleed connection for said chamber, and means for subjecting the side of said diaphragm remote from said seats to inlet pressure, said last mentioned means including a by-pass connection from the inlet.

6. In a diaphragm valve, a casing having an inlet and outlet, a diaphragm, a plurality of spaced seats of different included areas for said diaphragm with the inlet communicating with the area within the seat of smallest included area, there being a chamber intermediate said seats, a bleed connection for said chamber, and means for subjecting the side of said diaphragm remote from said seats to inlet pressure, said last mentioned means including a by-pass connection from the inlet with a temperature responsive valve in said by-pass connection.

7. As an article of manufacture, a diaphragm valve comprising a casing composed of upper and lower members, an inlet and outlet connection in one of said members, a plurality of seats intermediate said inlet and outlet connections, the space within one of said seats communicating directly with the inlet connection, a diaphragm for cooperation with said seats, and means for subjecting the side of the diaphragm remote from said seats to pressure from the inlet, said valve providing a chamber intermediate said seats adapted to communicate with the inlet when the valve moves from one of the seats, and means for bleeding said chamber.

8. As an article of manufacture, a diaphragm valve comprising a casing having a diaphram, a plurality of seats of different diameters one outside of the other for engaging said diaphragm, and fluid pressure connections for first raising the diaphragm from the inner seat and then from the outer seat, said fluid pressure connections including an inlet connection leading to the space within the inner seat and means for supplying fluid pressure through the diaphragm to the side of the diaphragm opposite said seats, and an outlet connection communicating with the casing exteriorly of the seat of largest diameter.

9. In a diaphragm valve, a casing having an inlet and an outlet, a diaphragm, a seat cooperating with said diaphragm between said inlet and said outlet, the space within said seat communicating directly with said inlet, means for subjecting the side of the diaphragm remote from said seat to pressure from the inlet, a bleed connection communicating with the last mentioned side of said diaphragm, and means for automatically increasing the effective pressure area on the seat side of the diaphragm to effect a snap-action opening movement thereof.

MAX S. UNGER.
CLARENCE W. ROBERTSHAW.